United States Patent [19]

Sackinger

[11] Patent Number: 5,356,524
[45] Date of Patent: Oct. 18, 1994

[54] ELECTRICAL METHOD FOR CONVERSION OF MOLECULAR WEIGHTS OF PARTICULATES

[75] Inventor: William M. Sackinger, Fairbanks, Ak.

[73] Assignee: University of Alaska, Fairbanks, Ak.

[21] Appl. No.: 49,867

[22] Filed: Apr. 20, 1993

[51] Int. Cl.[5] .................... C25B 9/00; C25C 7/00
[52] U.S. Cl. .................. 204/194; 204/222; 204/231; 204/275; 204/277; 204/278; 204/284
[58] Field of Search .............. 204/194, 222, 231, 275, 204/277, 278, 284

[56] References Cited

U.S. PATENT DOCUMENTS

| | | | |
|---|---|---|---|
| 3,715,301 | 6/1971 | Tassoney et al. | 208/8 |
| 4,021,298 | 5/1977 | Jones | 176/39 |
| 4,407,973 | 10/1983 | van Dijk et al. | 518/703 |
| 4,556,417 | 12/1985 | Martinez-Vera et al. | 75/35 |
| 4,566,961 | 1/1986 | Diaz et al. | 204/168 |
| 4,754,093 | 6/1988 | Jezl et al. | 585/500 |
| 4,770,753 | 9/1988 | Ramshaw | 204/212 |
| 4,973,776 | 11/1990 | Allenger et al. | 585/310 |
| 5,019,355 | 5/1991 | Sackinger | 422/186.04 |
| 5,105,028 | 4/1992 | Dufour et al. | 568/840 |
| 5,141,715 | 8/1992 | Sackinger et al. | 422/186.04 |

OTHER PUBLICATIONS

Experiments of the Smelting Reduction of Oxides of Iron, Chromium and Vanadium and Their Mixtures With Argon/Methane-Plasmas, D. Vogel et al., Steel Research, 60(3+4):177-181 (1989).

Primary Examiner—John Niebling
Assistant Examiner—Arun S. Phasge
Attorney, Agent, or Firm—Finnegan, Henderson, Farabow, Garrett & Dunner

[57] ABSTRACT

An electrical apparatus is provided for the conversion of compounds, elements, or mixtures which are in particulate form, into new compounds, elements or mixtures in gaseous, liquid, or particulate form. In a reaction chamber, particulates are mechanically transported into a first region of high electric field, where they acquire a charge and are projected into a second region in which a low-density plasma is maintained. Energetic plasma ions strike the surfaces of the particulates, causing chemical reactions and release of both neutral and ionic products species. Charge exchange on particulates causes the reduced-size particles to fall back into the first region, where the charging recurs and the cycle is repeated. Gaseous and particulate products are removed from the chamber. In one application, naturally-occurring ores may be reduced by a methane plasma; in another, coal may be converted in a methane plasma to intermediate range hydrocarbons.

5 Claims, 1 Drawing Sheet

ELECTRICAL METHOD FOR CONVERSION OF MOLECULAR WEIGHTS OF PARTICULATES

The present invention generally relates to the conversion of the molecular weight of compounds, elements or mixtures thereof, available in particulate form, into gases, liquids, and particulates containing different compounds, elements, and mixtures thereof, which are more valuable for industrial, commercial and consumer use. The invention more particularly may be applied to the reduction of metallic ores in particulate form, by an energetic low-density hydrogen-and methyl-ion plasma, which attacks the surfaces of the particles to remove oxygen, sulfur, and other elements and produces a wide variety of gaseous, liquid, and particulate output compounds which can be separated using known temperature/pressure distillation techniques. The invention may additionally be more particularly applied to the hydrogenation, and gasification, of coal particulates by an energetic low-density hydrogen-and methyl-ion plasma, which produces a wide variety of useful hydrocarbon gases and liquids.

BACKGROUND OF THE INVENTION

Metal-bearing ores occur often in nature as oxides, such as iron oxide, chromium oxide, vanadium oxide, titanium oxide, aluminum oxide, and silicon dioxide. The most obvious attempts to directly reduce these ores by contacting them with hydrogen have been impractical due to the cost of pure industrial hydrogen, and the high temperatures involved for the reaction. Processes of this type are typically conducted in chambers isolated from the oxygen of the air. One approach has been to use synthesis gas, a mixture of $H_2$ and CO obtained by reacting steam and carbon (or a hydrocarbon) at high temperature. Reaction of the hydrogen with the oxygen in the ore produces water, and the reaction of the carbon monoxide with the oxygen in the ore produces carbon dioxide. Another approach has been to use methane as a reducing gas temperatures in the order of 950° C. to 1200° C., as taught in U.S. Pat. No. 4,268,303. Using this approach on iron ore, moving-bed reactors and expensive heaters are needed, methane pyrolysis and carbon deposition takes place, and sintering of the iron particles into agglomerates is a problem. The operation of a moving-bed reactor with three zones is described in U.S. Pat. No. 4,556,417, which operates at only 900° C. to 960° C. with natural gas, and which avoids agglomerates. Considerable heat input is still necessary.

The use of an argon inert-gas plasma torch, projecting a stream of high-temperature argon ion onto the top surface of a crucible containing ore particulates, and with the injection of neutral methane gas onto the heated surface by means of a separate water-cooled lance, was described by Vogel et al. (Steel Research, 60, pp. 177–181 (1989)). This relies upon argon ion energy transfer to the neutral methane above the particulates, argon ion and argon neutral energy transfer to the exposed top layer of the particulates in the crucible, and the thermodynamics of the reduction reactions at high temperatures. The kinetics of oxygen removal are constrained by the mixing of unreduced particulates and reduced metal. It was not possible to reduce pure titanium oxide. Since this process took place at nearly atmospheric pressure, there was considerable energy loss from the argon arc, via the ambient gas neutrals, to the walls of the chamber as well as to the crucible. The use of a plasma torch to effect high temperatures, 6000° K. to 10,000° K., which can be used to melt refractory metals, to transfer energy to the surfaces of particulates, and to cause particulates to fuse to one another or to adjacent cold surfaces is well known. Such plasma torches are generally operated with a pure feed gas, such as argon, although the use of hydrogen can be envisioned provided that the ionic attack of plasma torch electrodes can somehow be avoided. The use of hydrocarbon-containing gases in a plasma torch is employed for the production of acetylene and/or carbon black, as the plasma energetics cause cracking of the gaseous hydrocarbon feedstock. A method is described in U.S. Pat. No. 5,105,028 for using a plasma torch and a feedstock gas mixture including a hydrocarbon-containing gas and a hetero-atom containing gas, ionizing the mixture, and creating a more complex compound such as an alcohol or phenol, by ion interaction in the plasma. The electric arc is also described in U.S. Pat. No. 4,566,961 as providing the energy for a process of combination of high molecular weight carbonaceous material with the hot gases containing $C_1$–$C_4$ saturated hydrocarbons from the arc, so as to produce low molecular weight hydrocarbon products. This process is operated at high, near-atmospheric pressures, and requires considerable input power due to the energy transfer by ambient neutrals to the walls of the enclosure. Moreover, the probability of repetitive interaction of the particulates (if coal is the type of high-molecular-weight carbonaceous feedstock used) with the available $C_1$–$C_4$ hot gases, is limited.

The use of a low-density plasma containing hydrocarbon ions and methyl ions, inside of an array of tubular elements, is described in U.S. Pat. No. 5,019,355, as a method for the production of higher hydrocarbons by ion-impact-stimulated chemical reactions at the interior surfaces of the tubular elements. Another U.S. Pat. No. 5,141,715 describes the use of a plasma and a set of electrode arrays to accomplish conversion of compound gases into other compound gases. However, the use of particulates in such apparatus is problematic, as the particulates would accumulate and clog the apertures or tubular elements described, impairing their function.

OBJECTS OF THE INVENTION

It is the object of this invention to convert the molecules in a stream of particulates into different molecules which may be output in gaseous, liquid or solid particulate form, by causing the repetitive interaction of the particulates with the ions and electrons of a suitable low-density plasma. It is a more particular objective of this invention to enable the reduction of metallic ores to elemental metals using a low-density methane plasma. It is a further particular objective of this invention to enable the conversion of coal particulates into intermediate-range hydrocarbon gases and liquids using a low-density methane plasma.

SUMMARY OF THE INVENTION

A stream of particulates is first put into contact with a metallic electrode of negative polarity, in a region of electric field produced by a second, adjacent, positive electrode. The particulates acquire electrons by conduction from the negative electrode, and are then projected, under the combined forces of gravity and the electric field, into a second region which is free of strong d.c. electric field but which contains a time-varying electric field of sufficient magnitude to cause ionization of feedstock gas neutrals which are injected into the second region at a pressure well below atmospheric pressure. The negatively-charged particulates are impacted by the positively-charged energetic ions; the surface interactions thus induced on the particulates lead to destruction of the chemical bonds of the solid, and the emission from the particulate surface of new compounds, most of which are gaseous neutrals, and some of which are ions. Reduction of the size of the particle, and chemical removal of oxygen, sulfur, and similar elements from the particle in the case where a hydrogen-ion and methyl-ion plasma is used, is the result. After charge neutralization of a particle due to multiple ion impacts, the gravity force dominates and returns the particle, now smaller, back to the first region where it contacts the negative-polarity electrode again. It recharges with electrons, and the process repeats, further diminishing the particle size. If the gas which is used to produce the low-density plasma is chosen properly, it is possible that all of the new compounds generated by the process will be gaseous, and can be pumped away and separated by low temperature/low pressure distillation techniques. In the case of other gases, metallic or compound particles may remain and may be transferred laterally along the negative electrode, by vibration or other means, to a region free of electric field, for removal from the apparatus. Fine particulates of natural ores may be reduced in this way. If high-carbon-number carbonaceous particles such as oil shale, tar sands or coal are used, the combination of them with ions in a hydrogen or methane low-density plasma will produce intermediate weight hydrocarbon gases, along with other products. In every case in which a hydrocarbon source is used for the plasma, a spectrum of new hydrocarbon gases is created, along with hydrogen and other gases.

DESCRIPTION OF THE PREFERRED EMBODIMENTS

Figure 1:
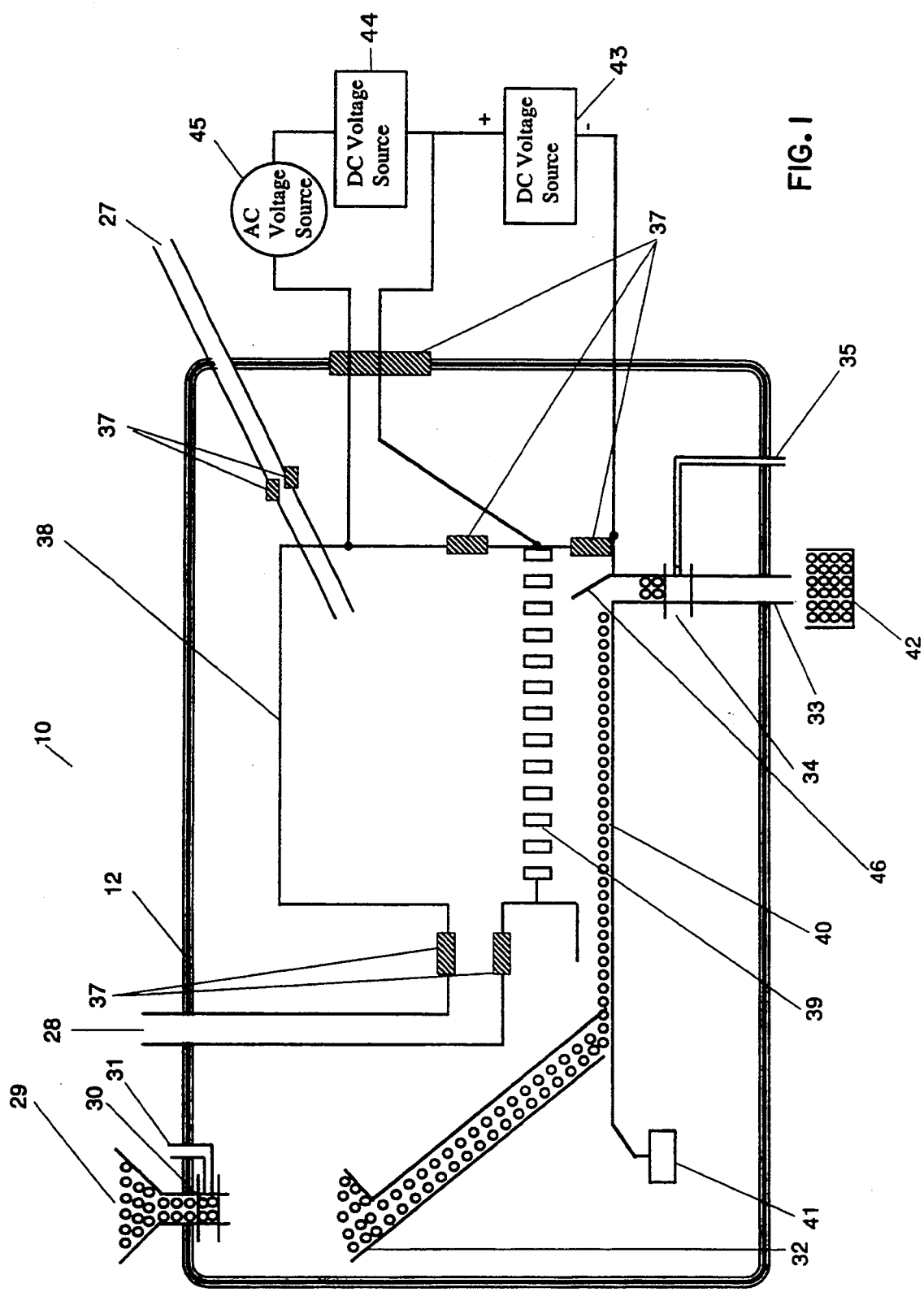
FIG. 1: A diagram of the apparatus example for conversion of molecular weights of particulates.

Referring now to the drawings and in particular to FIG. 1, there is shown an electrical apparatus 10 for the conversion of molecular weights of particulates, comprising a chamber 12 with walls constructed of metal, glass, ceramic, or other material providing for a hermetic seal, with an inlet gas source 27, an outlet gas port 28, an inlet port for particulates 29, transmitting particles through an air lock 30, in which admitted air is evacuated through a pumping port 31 before the particles are allowed to enter the main feed section 32. A particulate output port is provided with a similar airlock 34 which also has a pumping port 35 to evacuate air before a new charge of output particles are allowed to enter the airlock. Electrical insulators 37 are provided, isolating the plasma excitation electrode 38 from the grid electrode 39 and from the negative electrode 40. The surface of the negative electrode 40 is mechanically activated to convey particles either steadily or by vibration, with a mechanical activator 41 connected to electrode 40. Output particulates are discharged through output port 33 and are collected externally in a container 42. A high-voltage external d.c. voltage source 43 is connected between negative electrode 40 and porous, mesh or grid-type electrode 39. A second external d.c. voltage source 44 is connected in series with an external a.c. voltage source 45, and their output is connected between grid electrode 39 and plasma excitation electrode 38. A low-level source of electrons 46 is connected to the negative electrode.

Briefly describing the operation of the device in the mode in which metallic ores are reduced, the input gas such as methane $CH_4$ is admitted through input source port 27, which particulates in the size range preferably less than two micrometers in maximum diameter are admitted through particulate port 29, airlock 30, and are allowed to flow under the forces of gravity down the main feed section 32 and onto the combined conveyor system and negative electrode 40 which is mechanically activated by activator 41. Particles move into a region of high-electric field caused by the presence of the voltage on grid electrode 39 caused by the external voltage source 43. Each particle may be regarded from an electrical circuit equivalent viewpoint as a series connection of a capacitance, related to particle size, shape, and dielectric constant, and a resistance, related to particle size, shape, surface resistivity, and volume resistivity. In the region of high electric field, there is a potential difference imposed across the particle, and an electron current flows from the negative electrode into the particle, following an exponential function of time and resulting in the accumulation of a net negative charge on the top surface of the particle. The electric field intensity must be large enough so that the total charge q thus accumulated, multiplied by the electric field strength E, results in an upward electrical force qE on the particle which slightly exceeds the downward gravity force, mg, after some elapsed time t which typically would be equal to or less than the time constant T for the aforementioned exponentially-varying charging process. Due to the net upward force, the particle is separated from the negative electrode 40 and is projected upward through the grid electrode 39, passing into the plasma-active region bounded by grid electrode 39 and plasma excitation electrode 38. A minor fraction of the particles may strike the grid electrode elements, release some of their negative charge, and fall back down to negative electrode 40 where the charging process is repeated and they are again projected upwards. The negatively-charged particles passing through the grid electrode 39 enter a region in which a comparatively weak d.c. electric field exists, produced by the external d.c. voltage source 44, together with a superimposed stronger alternating-polarity electric field produced by the external a.c. voltage source 45. Methane gas is injected into the same region, and ionization of methane neutral molecules is caused by electrons from the suitable electron source 46, which may be field emission, or photo emission, or thermionic, or beta-emitting radioactive source. The electrons, the hydrogen ions and the methyl ions thus created are accelerated to high-kinetic energy, in the range 10 eV to 60 eV or more, by the strong a.c. electric field and the superimposed d.c. electric field. However, the frequency of the a.c. voltage source 45 is chosen to be high enough that only the electrons and the ions in the region move an appreciable distance and acquire energy during each half period of the a.c. voltage source 45. In contrast, because of the much greater mass of the particles, the particles are unable to move a significant distance during the half period of the a.c. voltage source 45, and do not therefore absorb much energy from source 45. The alternating reversal of direction of the a.c. electric field results in only a small effect upon the trajectories of the particles, whereas the electrons and the ions gain 10 eV to 60 eV of kinetic energy during each half cycle of the a.c. source 45. Collisions take place, especially of the type in which the positive hydrogen and methyl ions strike the surfaces of the negatively-charged particles. The energetics of ion impact cause chemical reactions on the surfaces, in which the natural chemical bonds in the particulate material are broken, and new bonds are formed between the impacting ions and the available source atoms on the particles. For example, on a particle composed of a metallic oxide, the oxygen may combine with the impacting hydrogen to form a hydroxyl, and a second hydrogen ion impact may cause formation of a neutral water molecule. This would be desorbed readily from the surface in future impacts and would eventually appear in the gaseous output. Another competing process would be impaction of methyl ions, forming possibly water, and possibly carbon monoxide or carbon dioxide. A mixed layer of carbon, hydrogen, oxygen, and the metallic element would be formed on the surface, with stable gaseous neutral molecules leaving the layer, in significant quantities, immediately after an ion impact. Additional stable gas species may include metallic hydrides, organometallic gases such as those of dimethyl, trimethyl, or tetramethyl type, and perhaps alcohols and more complex organometallic compounds. It is also inevitable that higher hydrocarbon species will be created on, and released from, the surface, including acetylene, ethylene, ethane, propane, propene, propyne, and larger species. All such gases may be expected to appear in the gaseous output 28. Both unreacted methane and surface-produced methane will also appear in the output 28 as will hydrogen. Positive ion bombardment of the negatively-charged particulates will cause a change in net charge of the particulates, and if some particles actually strike the electrode 38 they will transfer electrons to the electrode and lose charge. For some particles, an elastic bounce of a particle from the surface of electrode 38, and the downward force of gravity, will move those particles back down through grid electrode 39 and to negative electrode 40. Other particles will have their negative charge neutralized by positive ion impact and will also move down through grid 39 to electrode 40. The particle mass will be smaller due to the many ionic impact events and the mass of gases lost from the surface of the particle. The process described above will then repeat, for the smaller particle, until the particle disappears, or until a stable small final particulate (such as a pure metal) is formed. Final particles are conveyed to the output airlock 34 and emerge in the container 42. Additional interactions include particle-particle collisions, which cause rotation of particles and the acquisition of transverse momentum. This tends to expose of all sides of each particle to energetic ion bombardment. Grazing collision angles between ions and particle surfaces are very common, and escape of the resulting neutral gas molecule products from the surface is thereby favored. Some energy of ionic impact will be transformed, over times of the order of nanoseconds to microseconds, into heating—e.g. random thermal motion—of the atoms inside of the particle. This will help to cause the release of neutral gas species from particle surfaces, and will promote reactions at the surfaces. The recharging of the particles, when they are in contact with negative electrode 40 for the second and subsequent times, is enhanced by both the bombardment-induced conductivity of the particle surface, and by the presence of discontinuous islands of reduced metal at the surface which have a semiconducting character. The formation of a complex carbon-hydrogen-oxygen-metallic amorphous layer, with voids, at the particle surface, forestalls any tendency towards agglomeration of particles.

Bombardment of grid electrode 39 by positive ions will cause chemical reactions among the various neutral species adsorbed on the grid surfaces, and with the impacting ions. This can be controlled by adjustment of the polarity and magnitude of external d.c. supply voltage source 43, so that positive ions with energies of 10 eV to 60 eV do not impact upon the gird, but are repelled from it. Electrons from the methane plasma will be drawn to grid 39 and electrode 38. This confines the ions to the region above the grid electrode 39. If maximum interaction between ions and particulates is desired, and grid erosion is tolerable, the opposite polarity of the external d.c. supply voltage source 43 may be used, so that ions penetrate through the apertures of grid electrode 39 and begin to interact very energetically with particulate surfaces even in the region between electrodes 40 and 39. This may be limited by the supply of new ions generated by the a.c. voltage in the region between electrodes 39 and 38. A limiting case of this type of operation includes positive ion neutralization of negative charges on particulates before they are lifted up off of electrode 40. While possible, this limits the available surface area on the particles which is subject to ionic impact. The lower conversion rate thus achieved would be at least partially offset by the additional conversion due to the much larger ionic impact energy.

Although the a.c. electric field between electrodes 39 and 38 is illustrated as a dipole field, it is possible that a quadrupolar field, or a higher order multipolar field, could be established in the region, by suitable segmentation and reconnection of electrodes 39 and 38, with separate additional external potential sources connected between pairs of said segments. Ionic paths (neglecting collisions with particles) would be curved, and oscillatory, rather than linear and oscillatory. Such curved paths could be either in the vertical plane, or in the horizontal plane or both.

Particulate natural minerals, such as metallic oxides, sulfides, chlorides, fluorides, carbonates, sulfates, nitrates, and more complex compounds can be reduced in this apparatus. This formation of either hydrides, organometallics, or pure metal particles of the elements in Groups I-VI of the Periodic Table may be expected, and other compounds are possible.

Particles composed of high hydrocarbons, such as coal, may be combined with methane in this apparatus to yield a rich spectrum of hydrocarbon gases and liquids which are more easily transported by pipelines and utilized as fuels and in further chemical processes. Inorganic content of such feedstock, such as silica or other minerals, can also be decomposed and reduced. Mixed materials such as oil shale, tar sands, and carbonaceous shales may also be treated. Waste particulates from combustion or from industrial processes may also be treated.

Output gases may be separated in low-temperature/low-pressure distillation stages for selection of components for specific uses. Such equipment is conventional and is not shown.

Inasmuch as the present invention is subject to many variations, modifications, and changes in detail, it is intended that all subject matter discussed above or shown in the accompanying drawing be interpreted as illustrative and not in a limiting sense. Such modifications and variations are included within the scope of this invention as defined by the following claims.

What is claimed is:

1. An apparatus for converting particulates composed of substances having one or more molecular weights, into molecules having one or more different molecular weights, comprising:

A reaction chamber means having chamber walls, inlet particulate means, inlet gas means, outlet gas means, and outlet particulate means;

particulate mechanical transport means, mounted in said reaction chamber, comprising a mechanically-moving surface, said surface also comprising a first electrode means;

second electrode means mounted in said reaction chamber located adjacent to said first electrode means; said second electrode means being porous to allow passage of a fraction of projected particulates, said first and second electrode means defining a first particle projection region between them;

third electrode means mounted in said reaction chamber located outside of said first particle projection region and adjacent to said second electrode means, said second and third electrode means defining a second particle projection region between them, said second particle projection region being located above said first projection region;

a first external potential source electrically connected to said first and second electrode means;

a second external potential source comprising both a time-varying component and a static component, said second external potential source being connected to said second and third electrode means.

2. An apparatus as claimed in claim 1, wherein said second electrode is a grid containing a plurality of open apertures, said grid being disposed substantially co-parallel to said first electrode means.

3. An apparatus as claimed in claim 1, wherein said third electrode is segmented into a number of segments, with separate additional external potential source means connected to each of said segments.

4. An apparatus as claimed in claim 1, wherein said second electrode is segmented into a number of segments, with separate additional external potential source means connected to each of said segments.

5. An apparatus for converting particulates composed of substances having one or more molecular weights, into molecules having one or more different molecular weights, comprising:

A chamber having first inlet means for introducing said particulates into said chamber, second inlet means for introducing inlet gas into said chamber, first outlet means for removing gaseous substances having said different molecular weights, and second outlet means for removing particulates having other different molecular weights, from said chamber;

electrode means mounted in said chamber, defining a first projection region and a second projection region, said second projection region containing a plasma and being located above said first projection region, said regions being separated by a porous electrode bounding both of said regions and allowing particulate passage between said regions; and potential source means connected to said electrode means to provide electric fields for particulate projection and for plasma creation and energization.

* * * * *